United States Patent [19]
Peters

[11] Patent Number: 5,894,763
[45] Date of Patent: Apr. 20, 1999

[54] FLYWHEEL AND CRANK APPARATUS

[76] Inventor: Robert R. Peters, 4730 Fairmount Ave., Kansas City, Mo. 64112

[21] Appl. No.: 08/954,927

[22] Filed: Oct. 21, 1997

Related U.S. Application Data

[63] Continuation of application No. 08/588,994, Jan. 19, 1996, abandoned.

[51] Int. Cl.$^6$ ...................................................... F16C 11/02
[52] U.S. Cl. ................................ 74/598; 74/597; 123/197.4
[58] Field of Search ............................. 74/595, 596, 597, 74/598; 123/197.4

[56] References Cited

U.S. PATENT DOCUMENTS

| | | | |
|---|---|---|---|
| 344,930 | 7/1886 | Woodbury | 74/598 X |
| 1,024,817 | 4/1912 | Arnold | 74/597 |
| 1,690,296 | 11/1928 | Hirth . | |
| 1,717,572 | 6/1929 | Martin et al. | 74/597 |
| 2,364,109 | 12/1944 | Taylor . | |
| 2,380,099 | 7/1945 | Dusevoir . | |
| 2,448,742 | 9/1948 | Smith-Clarke et al. . | |
| 2,747,428 | 5/1956 | Peter et al. | 74/598 |
| 5,207,120 | 5/1993 | Arnold et al. . | |

FOREIGN PATENT DOCUMENTS

| | | | |
|---|---|---|---|
| 1270893 | 6/1968 | Germany | 74/598 |
| 530580 | 12/1940 | United Kingdom | 74/598 |

OTHER PUBLICATIONS

*Hot Rod Bikes;* Nov. 1995; vol. 2, No. 6.

*Primary Examiner*—Charles A. Marmor
*Assistant Examiner*—Mary Ann Battista
*Attorney, Agent, or Firm*—Litman, Kraai and Brown, L.L.C.

[57] ABSTRACT

A split flywheel and crank pin apparatus having a pair of flywheels held in a preselected spaced relationship to rotate about a common axis by a pin spaced from the axis. The pin has a central section and opposed ends. Each end has an undulating surface with a continuously varying radius for a circumferential path along the surface and a constant radius along a path on the surface parallel to a main axis of the pin. The pin ends are snugly received in bores in respective flywheels that have internal surfaces that mirror the pin end surfaces. The pin ends are separated from the pin central section by shoulders that abut facing surfaces of the flywheels. The pin is held in each flywheel by a nut. The pin includes lubricating passageways for lubricating a journal surface of the pin central section.

12 Claims, 2 Drawing Sheets

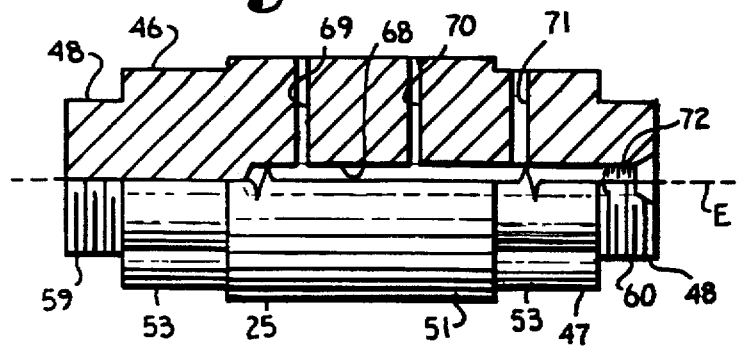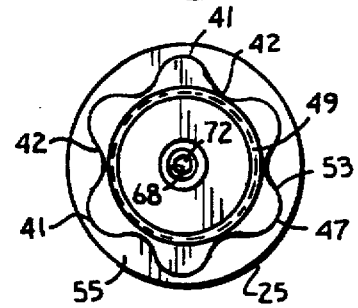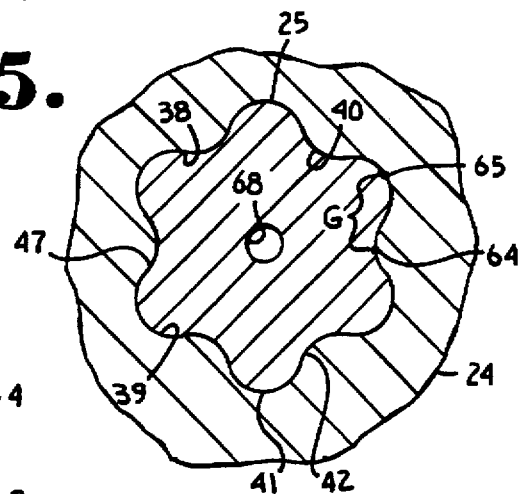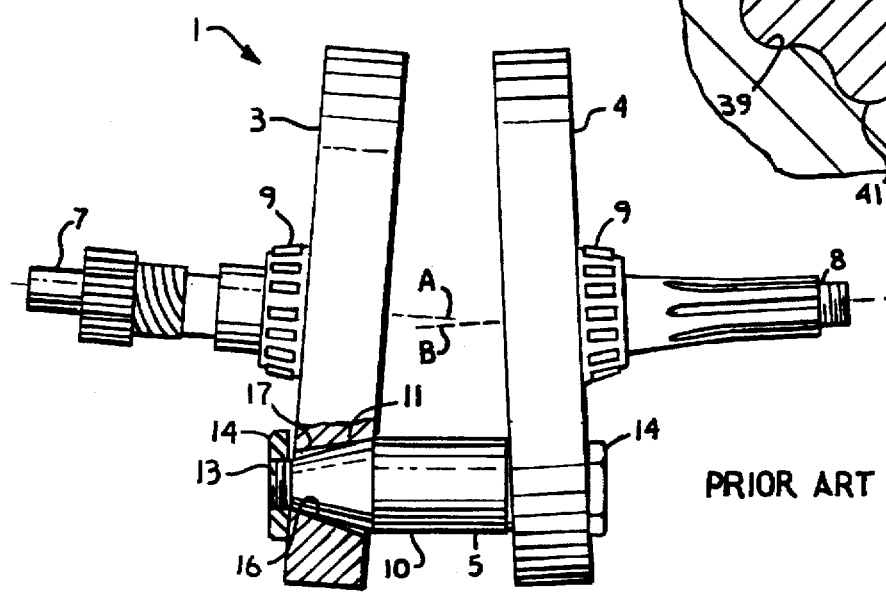

FLYWHEEL AND CRANK APPARATUS

CROSS REFERENCE TO RELATED APPLICATIONS

The present application is a continuation of U.S. application Ser. No. 08/588,994 on a FLYWHEEL AND CRANK APPARATUS, filed Jan. 19, 1996, now abandoned.

BACKGROUND OF THE INVENTION

The present invention is directed to a flywheel and crank apparatus having a pair of flywheels separated by a non-axially aligned crank for use in motorcycle engines and the like.

Many types of engines, pumps and related devices utilize a pair of flywheels which are mounted so as to rotate a common axis thereof. Also aligned along the axis of rotation of the flywheels is at least one shaft which provides power either from or to the flywheels. The flywheels are spaced by a crank throw, pin or shaft which is offset from the axis of rotation of the flywheels. A piston rod or similar device is attached to and rotates about the crank shaft, normally to convert between linear motion at a piston to a rotary motion at the flywheels. The power taken in and given off may in theory move in either direction across the machine.

For some types of split flywheel motors operating at low RPM's and under comparatively light loads, the power associated with the motor is not extremely great and does not present significant problems at the crank shaft. However, some devices of this type are designed to utilize a substantial amount of power which applies substantial forces at the juncture of the flywheels with the crank shaft. A good example of a motor of this type is a racing motorcycle having an engine of this type placed under substantial strain. Quite substantial power loadings can and are placed upon the motorcycle engine during operation and forces oil to twist the flywheels relative to the connecting crank shaft. Because the crank shaft is offset with respect to the axis of rotation of the flywheels and because of other factors found in engines of this type, it is very difficult to maintain proper coaxial alignment of the flywheels.

In particular, the flywheels may become unevenly spaced therebetween such as when they toein opposite the crank shaft or when they toeout opposite the crank shaft. An example of toein can be seen in FIG. 6 of the drawings showing prior art. The flywheels may also rotate relative to one another about an axis associated with the crank shaft so as to no longer have a common axis of rotation. In all three instances noted, the flywheels have axes of rotation which are no longer commonly aligned which leads to at best an imbalance in the engine and a reduction of power. In a worst case scenario, the misalignment of the axes of rotation of the flywheels can lead to catastrophic destruction of the engine.

Historically, flywheels of this type have often been separated by crank shafts that have tapered opposite ends and which are designed to set in a similarly tapered bore in each of the flywheels. To initially align the flywheels so that they are co-axle relative to one another, they are placed in a trueing stand having plates that hold the flywheels generally parallel to one another while nuts holding the opposite ends of the crank shaft to the flywheels are tightened. Trueing in this manner is a laborious and difficult procedure. Even with use of the trueing stand, it is difficult to get the best alignment. Also, a very high torque must be applied to the nuts in order to try to prevent slippage, for example 600 pounds per square inch torque, which often damages threads associated therewith. Keys or splines are sometimes used to help prevent turning of the crank shaft relative to the flywheels, but this does not prevent slippage such that the crank shaft axes is no longer parallel to the axes of rotation of the flywheels. Even when the torque applied to the nuts is very high, there is normally some slippage that occurs over time during usage.

Even if a manufacturer or mechanic is able to correctly align the flywheels relative to the crank shaft upon assembly of the device, the application of a large load or just extended usage of the device normally leads to misalignment of the flywheels. Consequently, it is desirable to provide a dual flywheel and crank shaft apparatus that effectively and positively properly positions the flywheels relative to one another and which resists misalignment of the flywheels during use.

SUMMARY OF THE INVENTION

An apparatus is provided utilizing a pair of spaced rotating discs or plates, especially flywheels, that rotate about a common axis of rotation. The rotating plates are spaced by an eccentrically positioned pin or crank shaft, preferably having at least one piston rod journaled thereon. The crank shaft fixes the plates in a preferred spaced configuration so that the plates rotate about a common axis associated therewith and so that the plates are normally prevented from deviating from that configuration due to torque or force applied to the apparatus during heaving, loading or normal extended usage. The crank shaft also relatively easily allows proper assembly of the apparatus including the plates and crank shaft without the need of an external jig or trueing frame.

The crank shaft is an elongate rod having a central cylindrical portion positioned between the plates and having plate abutment shoulders at opposite ends of the central portion. Projecting axially outward from each of the shoulders is a plate engaging stub. Adjacent to the shoulder associated with each stub and extending for approximately the width of the plates is a surface that includes a series of radially varying lobes that form a sinusoidal like curve that is wrapped in a circle when viewed from the side. The lobed surfaces vary in radius along each surface circumferentially and are constant in radius when moving along the surface parallel to the axis of the shaft.

A distal or tail end extends axially outward from each stub and is threaded. An axially central bore in the crank shaft connecting with multiple radial bores allows for distribution of oil along the surface of the center section of the shaft.

Each of the plates includes a receiving aperture or bore passing therethrough which abuttingly receives a respective stub of the crank shaft. Each of the plate bores is sized and shaped so as to snugly and tightly receive the crank shaft stub and especially having a similar undulating set of lobes which mates generally uniformly with and is a mirror image of the lobes of the crank shaft stub. A nut is utilized to mate with each of the threaded ends of the crank shaft and lock the stubs within the plates. In this manner one of the shoulders and one of the nuts abuts opposite sides of each of the plates and holds the plate mating section of the crank shaft locked in place within the plates. The central axis of the crank shaft is aligned to be parallel to the colinear axes of rotation of the plates.

OBJECTS AND ADVANTAGES OF THE INVENTION

Therefore the objects of the invention are: to provide an apparatus having a pair of spaced plates that rotate about a common axis and are joined by an eccentricly positioned shaft that is relatively easy to assemble and which fixedly holds the plates in a configuration to allow the plates to rotate about a common axis of rotation thereof; to provide such an apparatus wherein the plates are spaced flywheels and the shaft is a crank shaft having journaled thereon piston rods of a motorcycle engine; to provide such an apparatus wherein the shaft includes a central portion spacing the plates and having shoulders at each side of the central section butting against an innerside of each plate; to provide such an apparatus wherein the shaft includes stubs that are axially aligned and located on opposite sides of the center portion thereof and wherein the stubs include a plurality of axially extending circumferentially spaced lobes; to provide such an apparatus where the stubs include a distal threaded portion and wherein the radius associated with a surface on the stubs does not vary substantially when moving along the surface parallel to the axis of each stub; to provide such an apparatus which is relatively easy to construct without the need for trueing frames or key ways; to provide such an apparatus having mating apertures within each of the plates for slideably and snugly receiving the lobes of the stubs which are locked therein by placement of a mating nut on a threaded distal end associated with each stub; to provide such an apparatus that is comparatively very strong in use and which substantially resists misalignment of the plates during use of the apparatus; and to provide such an apparatus and method of construction of the apparatus that are comparatively simple, easy to use and especially well adapted for the intended purpose thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 3 is an enlarged and front side elevational view of the crank shaft, shown in FIG. 1, with portions broken away to show interior detail thereof.

FIG. 4 is an enlarged and side elevational view of the crank shaft.

FIG. 5 is an enlarged and crosssectional view of the apparatus, taken along line 5—5 of FIG. 2.

FIG. 6 is a front elevational view of a prior art apparatus illustrating a pair of spaced flywheels and a connecting crank shaft.

DETAILED DESCRIPTION OF THE INVENTION

Figure 1:
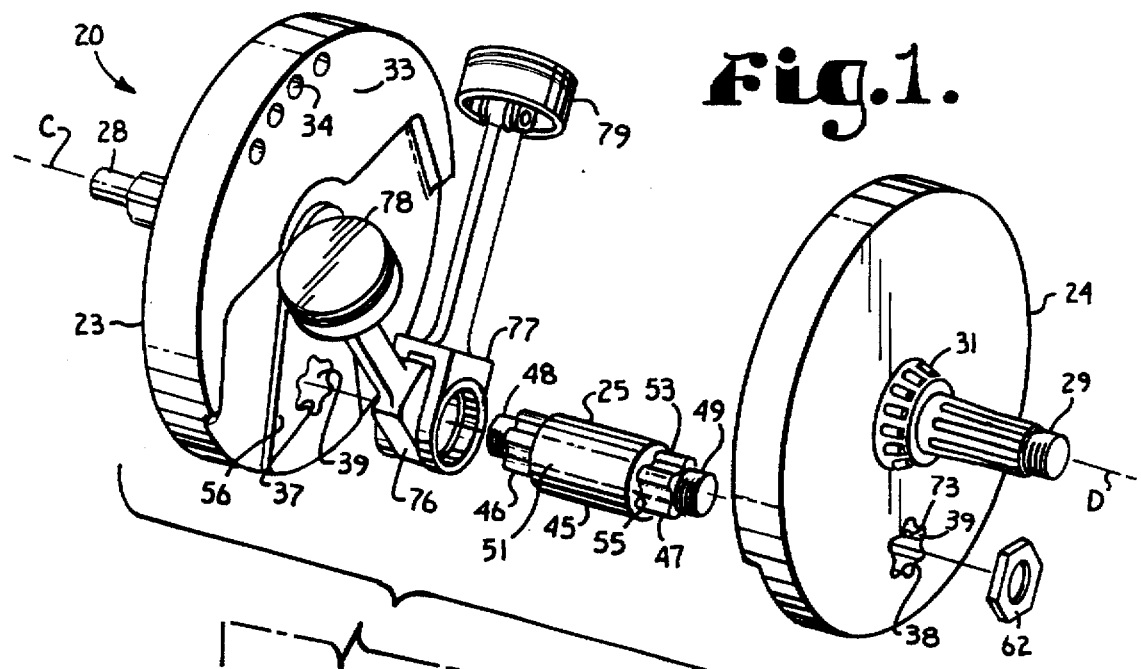
FIG. 1 is a perspective and exploded view of a flywheel and crank apparatus of a motorcycle engine.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Illustrated in FIG. 6 is a prior art flywheel and crank pin apparatus generally designated by the reference numeral 1. The apparatus 1 includes a pair of spaced flywheels 3 and 4 and a crank pin 5. The flywheels 3 and 4 are mounted on shafts 7 and 8 respectively which operably function to support the flywheels 3 and 4 in a conventional engine (here a motorcycle two cylinder engine) and which convey power therefrom. The shafts 7 and 8 are shown in conjunction with a pair of bearings 9 that are functionally received and supported by races in an engine of this type, especially motorcycle engines on motorcycles sold under the brand name Harley Davidson.

The pin 5 operably joins the flywheels 3 and 4. The pin 5 has a central section 10 and opposite truncated conical sections 11 that are joined with the central section 10 so as to be coaxially aligned along an elongate axis of the central section 10. At a distal end of each conical section 11 is a threaded region 13 upon which is mounted a threaded nut 14. Each of the conical sections 11 is received in a tapered bore 16. The bores 16 are each located in respective flywheels 3 and 4 at spaced locations from the respective axes of rotations identified by the reference letters A and B.

The junction of the conical sections 11 with the tapered bores 16 is preferably supposed to maintain the flywheels 3 and 4 in a selected spaced relationship relative to one another and so that the axes of rotation of each that are identified by the reference letters A and B are coaxially. A key 17 may be positioned to prevent rotation of the pin 5 relative to each flywheel 3 and 4. In the configuration shown in FIG. 6 the flywheels 3 and 4 have slipped from that configuration relative to the pin 5 so that the flywheels now have a toein alignment relative to one another, that is the sides of the flywheels 3 and 4 that are diagonally opposite the pin 5 are much closer to each other than the sides closest to the pin 5 and the axes of rotation identified by the reference letters A and B are not colinear or coaxial.

The configuration shown in FIG. 6 illustrates one of three possible misconfigurations of the flywheels 3 and 4 which include toein, toeout and swinging about the pin 5 with each misconfiguration producing a non-coaxial alignment of the axes of rotation of the flywheels 3 and 4. Such misconfigurations occur because the flywheels tend to become displaced at their connection with the pin conical sections 16 due to application of a large force due to a relative high power load applied to the apparatus 1 or due to wear during use. The nuts 14 are frequently tightened to comparatively high torques in the order of 600 pounds per square inch in order to reduce the likelihood of misalignment, but such still occurs.

Illustrated in FIGS. 1 through 5 is a flywheel and crank pin apparatus 20 that is generally representative of the present invention. The apparatus 20 includes a pair of spaced flywheels 23 and 24 and a pin 25. The apparatus 20 is designed and configured to replace the prior art apparatus 1 in an otherwise conventional engine 26, especially a two cylinder motorcycle engine. The engine and motorcycle suitable for use in conjunction with such an apparatus 23 is otherwise quite conventional and is exemplified by two cylinder motorcycle engines utilized on motorcycles sold under the trademark Harley Davidson. The apparatus 20 is shown in an exploded or disassembled view in FIG. 1 and in an assembled view in FIG. 2.

The flywheels 23 and 24 each include a shaft 28 and 29 respectively. The shafts 28 and 29 are fixedly attached to and extend outwardly from the flywheels 23 and 24 in opposite directions. The shafts 28 and 29 mount in a conventional motorcycle engine and provide support to and power take off from the apparatus 20. Mounted on the shafts 28 and 29 are bearings 30 and 31 which are designed and configured to be received in races (not shown) in an engine 26 such as when the apparatus 20 replaces the apparatus 1 or comes as original equipment with such an engine.

Each of the flywheels 23 and 24 is weighted so as to be counterbalanced in the regions identified by the reference numeral 33, normally by the addition of lead weights 34 so that the entire apparatus 20 is generally balanced during rotation.

The flywheel 23 rotates about the shaft 28 and in particular about an axis of rotation which is identified by the reference numeral C. The flywheel 24 likewise rotates about an axis of rotation which is identified by the reference letter D. It is an intent of the design of the apparatus 20 to provide such an apparatus wherein the axes of rotation C and D are substantially always collinear and coaxial.

Located in spaced relationship to the shafts 28 and 29 in each of the flywheels 23 and 24 are bores 37 and 38 respectively. The bores 37 and 38 are seen in FIG. 1 and bore 38 is seen in crosssection in FIG. 5. The bores 37 and 38 are essentially identical and a reference with respect to a bore 38 applies also to bore 37 except where noted. Each of the bores 37 and 38 have an interior surface 39.

Each of the surfaces 39 is a curved surface which continually curves in an undulating pattern when following the surface circumferentially, as is seen in FIG. 5. In the illustrated embodiment each surface 39 has 6 curved splines or lugs 40 that are wider at the base of each than high. In particular, the pattern of each of the surfaces 39 produces a series or plurality of interconnected curves forming alternating peaks 41 and valleys 42 with a continuous repetition of the pattern. Each of the surfaces 39 has a continuously changing radius when following a circumferential path on a respective surface 39, that is a path that lies in the plane that is perpendicular to the axes C and D. Each of the surfaces 39 also has a constant or non-changing radius when a path is followed along the respective surface 39 that is axial or parallel to the axes C and D. It is noted that the crosssection shown of the surface 39 seen in FIG. 5 would be representative of the shown surface 39 at any crosssection taken perpendicular to the axes of rotation C and D. The surface 39 specifically follows a pattern that is sinusoidal in nature or sinusoidal like except that the sinusoidal curve is in turn wrapped in a circle which essentially has a radius that is halfway between the radius of the peaks 41 and valleys 42.

The pin 25 includes a central section 45, two flywheel engaging stub sections 46 and 47 and two threaded end sections 48 and 49, all of which are coaxially aligned and have an elongate axis identified by the reference letter E. The central section 45 has the stub sections 46 and 47 positioned on opposite sides thereof and the end sections 48 and 49 are in turn positioned on the outer sides of each of the stub sections 46 and 47 respectively.

The central section 45 has a cylindrical surface thereon which is preferably hardened and polished for use as a bearing or journal surface. Each of the stub sections 46 and 47 have undulating surfaces 53 thereon. The surfaces 53 are seen in perspective FIG. 1 and in end view in FIGS. 4 and 5. As is shown in FIG. 5, the surfaces 53 are mirror images of the surfaces 39 and are sized and shaped to be snugly and substantially uniformly received in and abut against the bore surfaces 39. Preferably, the surfaces 53 are substantially exactly the same width as the axial width of the flywheels 23 and 24 where the flywheels 23 and 24 engage the pin 25. The surfaces 53, as was previously noted for the surfaces 39, have a radius that continuously changes when passing along each surface 53 on a circumferential path and a radius which is essentially constant when passing along the surface 53 in a path that is parallel to the axes of rotation C and D.

The surfaces 53 each extend and abut against a respective shoulder 55 that in turn functions as the axially outermost limit of the cylindrical center section 45. The shoulders 55 are preferably planar and are perpendicular to an elongate axis E of the pin 25. Preferably, the surfaces 53 are a continuation of the pattern described above essentially up to where the shoulders 55 begin. That is the surface 53 are not substantially curved or modified whereat they intersect with the shoulders 55 except for the possibility of a slight radius of, for example one sixteenth of an inch to prevent degrading electrolysis activity. As can be seen in FIG. 4, the greatest radius of the surface 53 and consequently the stubs 46 and 47 is less than the radius of the central section 45. When the apparatus 20 is assembled, each of the shoulders 55 snugly and completely abuts against an interior surface 56 and 57 of flywheels 23 and 24 respectively. The surfaces 56 and 57 in the region of the abutment of the shoulders 55 therewith are preferably planar and are generally perpendicularly aligned relative to the pin central axis E. The abutment of the shoulders 55 against the flywheels 23 and 24 positively positions the flywheels 23 and 24 relative to each other thereby eliminating the need for trueing in a frame. The lugs 40 prevent rotation of either flywheel 23 or 24 about the axis E associated with the pin 25.

The end sections 48 and 49 each include circumferential threaded surfaces 59 and 60. When the apparatus 20 is assembled, as in FIG. 2, nuts 61 and 62 are respectively threadably received on the threaded surfaces 59 and 60 so as to secure and maintain the pin 25 in position relative to the flywheels 23 and 24.

Also once the apparatus 20 is assembled, forces are transmitted from the pin 25 to the flywheels 23 and 24 and subsequently to the shafts 7 and 8. The pin surfaces 53 and the flywheel bore surfaces 39 are configured to transmit such forces as evenly as possible. In particular, reference is made to FIG. 5. The reference numeral 64 identifies a point which is in the lowest of each of the valleys associated with the surface 53, that is, closest to the axis E. Likewise the point 65 identifies a point that is at the uppermost, that is, the point that is radially furtherest outward from the axis E. During operation of the apparatus 1 the forces are transmitted between the engagement of each surface 39 with a mating surface 53 entirely along the length of the surface, an example being identified by the bracket with the identifying reference letter G, that extends between the points 64 and 65 with only the section of such surfaces 39 and 53 directly at the points 64 and 65 not transmitted force. That is, substantially all of the surface 39 transmits force to the surface 53 as compared to typical splines having rectangular or similarly shaped configurations wherein forces not conveyed over a substantial portion of the spline.

The pin 25 also includes an axial passageway 68 flow connecting with two radial side channels 69 and 70 which open out onto the central section cylindrical surface 51. The passageway 68 is also flow connected with a radial bore 71. The flywheel 24 also has an internal bore 73 which is connected by conventional means to a source of lubricating fluid. The bore 73 opens onto the surface 39 associated only with the flywheel 24 and aligns with the bore 71 when the apparatus 20 is fully assembled. In this manner lubricating fluid is conveyed from a source to the cylindrical surface 51 of the pin 25 for lubrication thereon.

Figure 2:
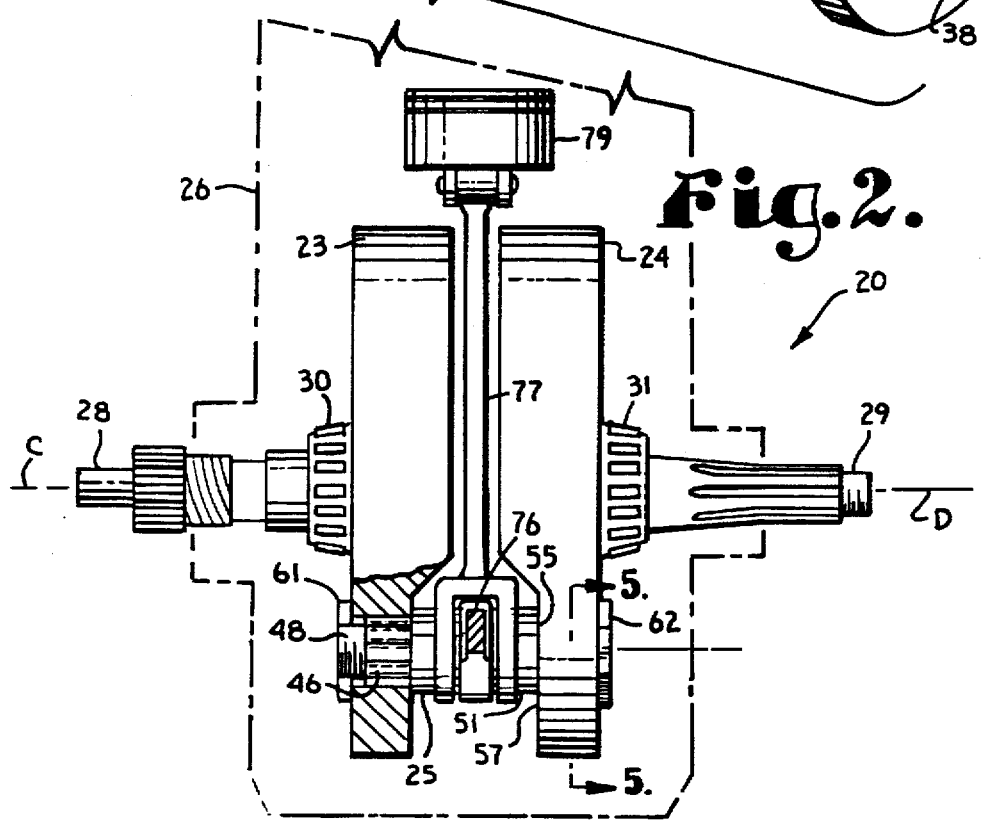
FIG. 2 is a front elevational view of the apparatus shown in FIG. 1 subsequent to assembly thereof and with portions broken away to show greater detail thereof.

As is seen in FIG. 2, a pair of piston rods 76 and 77 are sleeved on the pin cylindrical surface 51. The piston rod 77 is bifurcated and the piston rod 76 is positioned between the bifurcated lower end of the piston rod 77. Pistons 78 and 79 are located at distal ends of each of the piston rods 76 and 77 respectively. During operation of the apparatus 20, the pistons 78 and 79 are each received in a respective cylinder of the motorcycle engine 26 and reciprocate therein so as to be driven in a general reciprocating and linear manner. The reciprocating movement of the pistons 78 and 79 is in turn translated to the piston rods 76 and 77 which in turn apply force to the exterior surface 51 of the pin 25. This operably urges the pin 25 to move in a circle about the axes C and D which in turn rotates the flywheels 23 and 24 and subsequently the shafts 28 and 29 to provide power takeoff from the engine 26.

It is foreseen in accordance with the present invention that the connection between the pin 25 and flywheels 23 and 24 could be utilized advantageously in other types of machinery besides two cylinder motorcycle engines wherein a pair of spaced plates is operably rotated about a common axis of rotation by an asymmetrically positioned pin or throw. Such devices could include pumps, torque converters, turbochargers and other engines.

In the illustrated embodiment, the surfaces 39 and 53 are cut in metal, although the pin could be made from other substances such as plastic. This is quite difficult to do with many types of conventional machinery and in the past has been almost impossible, because of the requirement to have the surface 53 abut against the shoulders 55. Typically, when a cut is made close to a shoulder, such as shoulder 55, a substantial curvature is formed at the innersection of the area being cut and the shoulder. In the present invention it is most desirable not to have a substantial curved region at that location. Consequently, computer aided drilling machinery which can quite precisely position and place the stubs 46 and 47 and the bores 37 and 38 is utilized. An example of a machine utilized for this purpose is a computer aided end drill mill such as a Monarch Model UMC-150 Verticle Machining Center from Adams Machinery Co. Computer aided machining and in this case drilling, allows a tool maker to make a very precise and clean cut, but it is foreseen that such a structure could be formed with a key jabber or the curvature could be eaten away with an electrical discharge and a substantial amount of labor can be devoted to the project. Cutting the surfaces 53 close to the shoulders 55 allows the shoulders 55 to butt up against the plate surfaces 56 and 57 respectively and yet allows the mating surfaces 39 and 53 to engage each other across essentially the entire width thereof. The surfaces bores 37 and 38 as well as the surfaces 53 on the stub sections 46 and 47 must be very precisely aligned relative to each other during manufacture which is accomplished most easily using modern computer aided cutting machinery. For example, the pin 25 has both surfaces 53 thereon preferably exactly aligned with each other. That is, both sides are milled to exactly match and be mirror images of each other. Also preferably tolerances between the stub section 46 and 47 and the bores 37 and 38 are sufficiently close to require a tight press fit so as to reduce the likelihood of relative movement therebetween after assembly.

It is noted that in a preferred operation of the apparatus 1 the nuts 61 and 62 are tightened with a torque of approximately 200 pounds per square inch and the pin 25, at least the cylindrical surface 51 thereof where the rods 76 and 77 are journaled, is case hardened to approximately 40 thousands core hardness or 35 on the Rockwell side.

It is to be understood that while certain forms of the present invention have been illustrated and described herein, it is not to be limited to the specific forms or arrangement of parts described and shown.

What is claimed and desired to be secured by Letters Patent is as follows:

1. A rotatable apparatus for transferring energy comprising:
   a) a pair of spaced plates having axes of rotation that are coaxially aligned; each of said plates having a bore passing therethrough; each of said bores being spaced from and extending parallel to the axis of rotation associated with a respective one of said plates;
   b) a pin having opposed ends received in said bores and an elongate axis; and wherein:
   c) each of said bores having an undulating and sinusoidal like female surface formed of a continuous curve having peaks and valleys with each of said peaks and valleys formed of a continuous curved arc with each of the arcs being approximately equal in radius throughout and being aligned such that the female surface continuously varies in distance from said pin axis along a circumferential path on the female surface, but is generally constant in distance from said pin axis along a path parallel to said pin axis; each of said pin ends having a male surface that mirrors a respective one of said bore female surfaces and mates snugly with said bore female surface.

2. The apparatus according to claim 1 wherein:
   a) the curves of said bore female surface and said pin male surface are wrapped about a circle that is located coaxial with respect to said pin axis.

3. The apparatus according to claim 1 wherein:
   a) said pin has a central section having a central cylindrical surface that has a radius; each of said pin male surfaces is located on a respective stub end adjacent to said cylindrical surface; each of said pin male surfaces has a maximum radius less than said cylindrical surface radius so as to form a shoulder therebetween.

4. The apparatus according to claim 3 wherein:
   a) each of said shoulders is located in a plane perpendicular to said pin axis; and
   b) each of said plates has a surface that is also perpendicular to said pin axis and faces a respective said shoulder.

5. The apparatus according to claim 4 wherein:
   a) each said pin male surface extends to and substantially abuts against a respective said shoulder.

6. The apparatus according to claim 5 wherein:
   a) said pin male surface has a width approximately equal to a width of a respective said plate where said pin is joined to the plate; and
   b) each of said stub ends includes a threaded end section extending axially relative to said pin and beyond said pin male surface; said end section receiving a threaded nut to secure said pin in each said plate.

7. The apparatus according to claim 1 wherein:
   a) said plates are weighted flywheels each having a supporting axial shaft;
   b) said pin is a crankshaft having a cylindrical surface; and including
   c) a pair of piston rods journaled on said pin cylindrical surface.

8. The apparatus according to claim 7 wherein said apparatus is a piston and flywheel portion of a motorcycle engine.

9. A flywheel and crank apparatus for use in a motorcycle engine comprising:

a) a pair of spaced and weighted flywheels; each of said flywheels being attached to and having an axis of rotation about a supporting shaft; each of said flywheels having a bore with a center and being spaced from a respective one of said supporting shafts and extending therethrough; each of said bores having an internal female surface that is continuously curved having a sinusoidal like curvature that has peaks and valleys with each of said peaks and valleys being formed of a continuous arc with each of the arcs being approximately equal in radius throughout the length of each peak and valley and having a continuously varying distance from said bore center along a circumferential path on said female surface, but that is generally constant in distance from said bore center along a path on said surface that is parallel to the axis of rotation of an associated said flywheel;

b) a crank pin having a central cylindrical section with a cylindrical surface thereon, a pair of stub sections located on either side of said cylindrical section and being coaxial therewith and a pair of threaded end sections each being coaxial with said cylindrical section and positioned on opposite sides of said cylindrical section adjacent a respective one of said stub sections; each of said stub sections having thereon a male surface sized and shaped to snugly be received in abutting relationship to a respective said bore female surface; and c) a pair of threaded nuts; each of said nuts being received on a respective said pin threaded end section so as to secure said pin stub section in a respective said flywheel bore.

10. The apparatus according to claim 9 wherein:

a) each of said pin male surfaces abut said cylindrical section so as to form shoulders therebetween; said pin has an elongate axis and said shoulders are generally planar and aligned perpendicular to said pin axis.

11. The apparatus according to claim 10 wherein:

a) said cylindrical surface has sleeved thereon a pair of piston rods.

12. The apparatus according to claim 9 wherein:

a) one of said flywheels has an internal channel adapted to connect to a source of lubricating oil; said pin includes a passageway operably flow connected to said channel and to said pin central cylindrical section surface so as to provide for lubrication of said central cylindrical section surface.

* * * * *